W. J. CHELLEW.
LIQUID METER.
APPLICATION FILED SEPT. 21, 1917.

1,281,516.

Patented Oct. 15, 1918.

WITNESSES:
Chas. F. Bassett
Robert S. Bassett

INVENTOR
Walter J. Chellew

UNITED STATES PATENT OFFICE.

WALTER J. CHELLEW, OF BUFFALO, NEW YORK, ASSIGNOR TO GEORGE B. BASSETT, OF BUFFALO, NEW YORK.

LIQUID-METER.

1,281,516.      Specification of Letters Patent.      Patented Oct. 15, 1918.

Application filed September 21, 1917. Serial No. 192,434.

*To all whom it may concern:*

Be it known that I, WALTER J. CHELLEW, a citizen of the United States, residing at Buffalo, in the county of Erie and State of New York, have invented a new and useful Liquid-Meter, of which the following is a specification, reference being had to the drawings accompanying and forming part thereof.

My invention relates to improvements in liquid meters of the kind generally known as disk meters.

The objects of my invention are to prevent undue friction and wear between the disk driving spindle and the driven shaft lever of the gear train, and also to give other advantageous results.

I will now proceed to definitely describe the manner in which I have carried out my invention and then claim what I believe to be novel.

Figure 1:
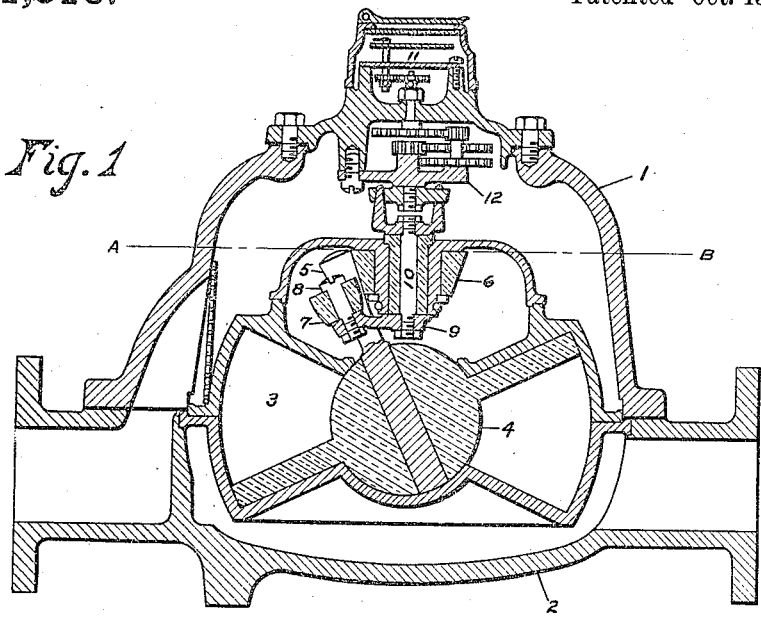
Figure 2:
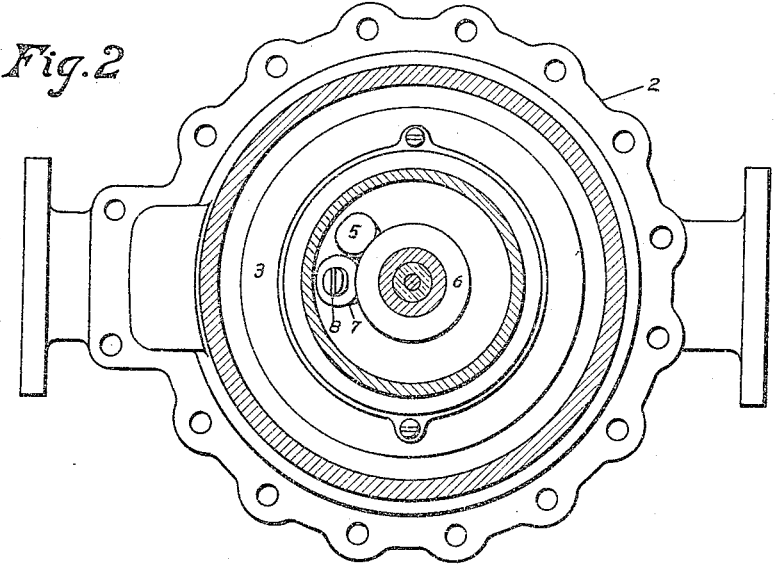

In the drawings, Figure 1, is a central vertical longitudinal section of my improved meter showing the interior working parts in place. Fig. 2 is a horizontal downward sectional view of my improved meter taken on the plane A—B in Fig. 1.

The outer casing of the meter is composed of two detachable parts, 1 and 2, which are fastened together by bolts passing through the meeting flanges thereof. Between parts 1 and 2 of the meter casing is supported the measuring disk chamber 3 in which nutates measuring disk 4 provided with a central driving spindle 5, that travels around controlling roller bearing 6 as the disk nutates. Bearing block 7, which may be made of hard rubber or other non-metallic substance, is mounted on stud 8, which may be cylindrical and whose axis is substantially in a plane with the axis of driving spindle 5, and which forms a part of driven lever 9 rigidly fastened to the lower end of driven shaft 10 which operates indicator 11 through intermediate gear train 12 of which shaft 10 is a part. As the pressure and consequent friction of driving spindle 5 required to drive lever 9 decrease in proportion as the point of contact of the two is removed from the axis of driven shaft 10; I extend driven lever 9 outwardly and upwardly in forming stud 8, thus locating bearing block 7 as far as possible from the axis of driven shaft 10 without increasing the height and consequent cost of the meter casing.

Heretofore disk driving spindle 5 has pressed directly on driven lever 9 causing undue friction and wear at the point of contact of the two. In my invention this friction and wear are greatly reduced by the use of the bearing block 7 which I have shown in the form of a roller, but which also may have any other shape without departing from the spirit of my invention.

Having thus described my invention, what I claim and desire to secure by Letters Patent is—

1. A liquid meter comprising a nutating measuring disk and its driving spindle, an indicator and gearing for operating said indicator, a lever rigidly mounted on the lower end of the driven shaft of said gearing, and a bearing roller block mounted on the free end of said lever with its axis substantially in a plane with the axis of said driving spindle; substantially as and for the purpose described.

2. A liquid meter comprising a nutating measuring disk and its driving spindle, an indicator and gearing for operating said indicator, a lever rigidly mounted on the lower end of the driven shaft of said gearing, and a non-metallic bearing roller block mounted on the free end of said lever with its axis substantially in a plane with the axis of said driving spindle; substantially as and for the purpose described.

3. A liquid meter comprising a nutating measuring disk and its driving spindle, an indicator and gearing for operating said indicator, a lever rigidly mounted on the lower end of the driven shaft of said gearing, and a hard rubber bearing roller block mounted on the free end of said lever with its axis substantially in a plane with the axis of said driving spindle; substantially as and for the purpose described.

WALTER J. CHELLEW.

Witnesses:
    CHAS. K. BASSETT,
    ROBERT S. BASSETT.

Copies of this patent may be obtained for five cents each, by addressing the "Commissioner of Patents, Washington, D. C."